US012735615B2

(12) United States Patent
Wang et al.

(10) Patent No.: US 12,735,615 B2
(45) Date of Patent: Sep. 15, 2026

(54) HIGH THERMAL CONDUCTIVITY PHASE CHANGE COMPOSITE

(71) Applicant: ROGERS CORPORATION, Chandler, AZ (US)

(72) Inventors: Wei Wang, Waltham, MA (US); Eui Kyoon Kim, Acton, MA (US); Randall Erb, Newton, MA (US); Rasam Soheilian, Brookline, MA (US)

(73) Assignee: ROGERS CORPORATION, Chandler, AZ (US)

( * ) Notice: Subject to any disclaimer, the term of this patent is extended or adjusted under 35 U.S.C. 154(b) by 1119 days.

(21) Appl. No.: 17/788,800

(22) PCT Filed: Jan. 5, 2021

(86) PCT No.: PCT/US2021/012181
§ 371 (c)(1),
(2) Date: Jun. 24, 2022

(87) PCT Pub. No.: WO2021/141895
PCT Pub. Date: Jul. 15, 2021

(65) Prior Publication Data

US 2023/0030910 A1 Feb. 2, 2023

Related U.S. Application Data

(60) Provisional application No. 62/958,644, filed on Jan. 8, 2020.

(51) Int. Cl.
*C09K 5/06* (2006.01)

(52) U.S. Cl.
CPC .................................... *C09K 5/063* (2013.01)

(58) Field of Classification Search
CPC ... C09K 5/063; C09K 5/06; C08J 7/04; B32B 27/18; B32B 27/38; B32B 27/08
See application file for complete search history.

(56) References Cited

U.S. PATENT DOCUMENTS

| | | | | |
|---|---|---|---|---|
| 7,439,475 | B2 * | 10/2008 | Ohta | H01L 23/373 257/E23.09 |
| 10,047,263 | B2 * | 8/2018 | Abhari | F28D 19/042 |
| 10,481,653 | B2 * | 11/2019 | Nguyen | H01L 23/373 |
| 2004/0161571 | A1 | 8/2004 | Duvall et al. | |
| 2007/0284366 | A1 | 12/2007 | Ohta | |
| 2010/0200801 | A1 * | 8/2010 | Ramasamy | H10W 40/735 252/74 |
| 2010/0316821 | A1 * | 12/2010 | Chang | B32B 3/30 428/35.8 |
| 2012/0061135 | A1 * | 3/2012 | Hill | H05K 9/009 174/388 |
| 2016/0223269 | A1 * | 8/2016 | Hartmann | B32B 27/00 |
| 2016/0263791 | A1 * | 9/2016 | Uibel | B29C 45/0013 |
| 2016/0319174 | A1 | 11/2016 | Razack et al. | |
| 2017/0018481 | A1 | 1/2017 | Zeng et al. | |
| 2017/0055339 | A1 * | 2/2017 | Zhang | H05K 1/0373 |
| 2018/0134418 | A1 * | 5/2018 | Hocker | B64G 1/62 |
| 2019/0107334 | A1 * | 4/2019 | Fujisaki | F28D 20/023 |
| 2019/0127620 | A1 | 5/2019 | Wei et al. | |

FOREIGN PATENT DOCUMENTS

| | | | | |
|---|---|---|---|---|
| WO | WO-2014208930 | A1 * | 12/2014 | H01L 23/3736 |
| WO | 2017189255 | A1 | 11/2017 | |

OTHER PUBLICATIONS

Chen et al. "Vertically Aligned and Interconnected Boron Nitride Nanosheets for Advanced Flexible Nanocomposite Thermal Interface Materials," ACS Appl. Mater. Interfaces 2017, 9, 30909-30917.
International Search Report; International Application No. PCT/US2021/012181; International Filing Date: Jan. 5, 2021; Date of Mailing: May 3, 2021; 6 pages.
Written Opinion; International Application No. PCT/US2021/012181; International Filing Date: Jan. 5, 2021; Date of Mailing: May 3, 2021; 8 pages.
Yuan et al., "Thermal Conductivity of Polymer-Based Composites with Magnetic Aligned Hexagonal Boron Nitride Platelets," 2015, ACS Appl. Mater. Interfaces, A-G.

* cited by examiner

*Primary Examiner* — Jane L Stanley
(74) *Attorney, Agent, or Firm* — CANTOR COLBURN LLP

(57) ABSTRACT

In an aspect, a layered phase change composite comprises a phase change layer comprising a phase change material, a plurality of boron nitride particles, and a binder; and a first capping layer and a second capping layer located on opposing sides of the phase change layer. In another aspect, a method of making the layered phase change composite comprises forming the first capping layer from a first composition; forming the phase change layer from a phase change composition, wherein the forming the phase change layer comprises vibrating the phase change composition on a 3-directional vibration stage; and forming the second capping layer from a second composition.

18 Claims, 1 Drawing Sheet

HIGH THERMAL CONDUCTIVITY PHASE CHANGE COMPOSITE

CROSS REFERENCE TO RELATED APPLICATIONS

This application is a National Stage application of PCT/US2021/012181, filed Jan. 5, 2021, which claims the benefit of U.S. Provisional Application Ser. No. 62/958,644, filed Jan. 8, 2020, both of which are incorporated by reference in their entirety herein.

BACKGROUND

Circuit designs for electronic devices such as televisions, radios, computers, medical instruments, business machines, and communications equipment have become increasingly smaller and thinner. The increasing power of such electronic components has resulted in increasing heat generation. Moreover, smaller electronic components are being more densely packed into ever smaller spaces, resulting in more intense heat generation. At the same time, temperature-sensitive elements in an electronic device often need to be maintained within a prescribed operating temperature in order to avoid significant performance degradation or even system failure. Consequently, manufacturers are continuing to face the challenge of dissipating heat generated in electronic devices.

There remains a need for new approaches for thermal management in various devices, particularly in electronic devices, and an increasing demand for electrically insulating materials with enhanced heat dissipation ability.

BRIEF SUMMARY

Disclosed herein is a layered phase change composite having a high thermal conductivity.

In an aspect, a layered phase change composite comprises a phase change layer comprising a phase change material, a plurality of boron nitride particles, and a binder; and a first capping layer and a second capping layer located on opposing sides of the phase change layer.

In another aspect, a method of making the layered phase change composite comprises forming the first capping layer from a first composition; forming the phase change layer from a phase change composition, wherein the forming the phase change layer comprises vibrating the phase change composition on a 3-directional vibration stage; and forming the second capping layer from a second composition.

In yet another aspect, an article can comprise the layered phase change composite.

The above described and other features are exemplified by the following figures, detailed description, and claims.

BRIEF DESCRIPTION OF THE DRAWINGS

The figures are exemplary embodiments, wherein the like elements are numbered alike.

DETAILED DESCRIPTION

A phase change material (PCM) is a substance with a high heat of fusion that can absorb and release high amounts of latent heat during a phase transition, such as melting and solidification, respectively. During the phase change, the temperature of the phase change material (referred to herein as the transition temperature) can remain nearly constant, essentially inhibiting or stopping the flow of thermal energy through the material. In this manner, heat can be reversibly stored and removed from a phase change material. Although a solid block of phase change material has a very large theoretical capacity to absorb heat, the process is not generally rapid due to difficulties of heat transfer throughout the material. It has therefore been challenging to develop articles comprising phase change materials for a variety of applications where a faster transfer of heat into and out of the material is needed.

In order to increase the heat transfer into and out of the phase change material, a layered phase change composite was developed that includes a phase change layer. The phase change layer comprises a phase change material, a plurality of boron nitride particles, and a binder. Including the boron nitride particles in the phase change layer resulted in a surprising increase in the transfer rate of heat into and out of the phase change layer. The combination of the boron nitride particles and the phase change material can be particularly advantageous for use as a thermal management material, especially in electronics, in that a high crystallinity of the phase change material can allow for a combination of high latent heat capacity and energy absorption, while the boron nitride can introduce higher thermal conductivity and electrical insulation. This combination of properties can lead to improved heat management, lower heat buildup, fewer problems, and can permit better management of the temperature intermittency. The layered phase change composite can provide improved thermal stability to an article, thereby reducing degradation of performance and increasing the lifetime of the article.

It was further discovered that if the phase change layer was formed while vibrating in three directions, then the boron nitride particles, particularly platelets thereof, in the phase change material can be aligned in a direction perpendicular to the broad surface of the phase change layer. The perpendicular alignment of the boron nitride particles can result in a further increase in the thermal conductivity of the phase change layer.

Figure 1:
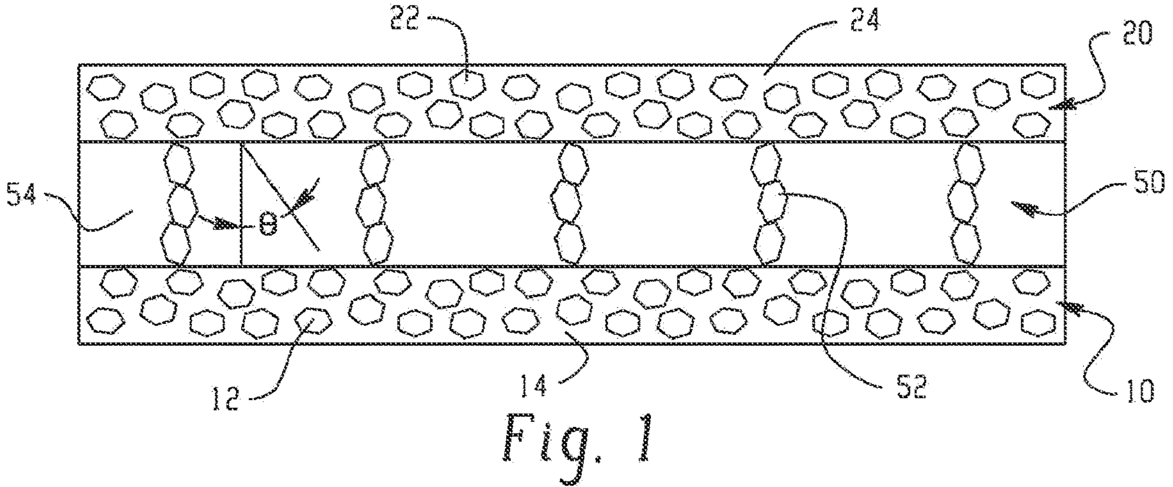
FIG. 1 is an illustration of an embodiment of a high thermal conductivity layered phase change composite.

An embodiment of a layered phase change composite comprising a phase change layer having a first capping layer and a second capping layer located on opposing sides of the phase change layer is illustrated in FIG. 1. FIG. 1 illustrates a phase change layer 50 comprising a plurality of boron nitride particles 52 and a phase change material 54. Capping layers 10 and 20 are located on opposing sides of the phase change layer 50. First capping layer 10 comprises a first plurality of boron nitride particles 12 in a first polymer 14 and second capping layer 20 comprises a second plurality of boron nitride particles 22 in a second polymer 24. The first capping layer 10 and the second capping layer 20 are in direct physical contact with the phase change layer 50. A thickness of the phase change layer 50 can be 0.05 to 10 millimeters (mm), or 0.5 to 2 mm, or 0.5 to 1.5 mm. The first capping layer 10 and the second capping layer 20 can each independently have a layer thickness of 0.001 to 1 mm, or 0.01 to 0.5 mm.

The layered phase change composite can have a heat of fusion of at least 50 Joules per gram (J/g), or at least 75 J/g, or at least 100 J/g, or at least 240 J/g, or 50 to 150 J/g measured in accordance with ASTM D3418-15. The layered phase change composite can have a thermal conductivity of greater than 0.5 Watts per meter Kelvin (W/mK), or 0.5 to 1 W/mK measured in accordance with ASTM D5470-17.

Phase change materials have a characteristic transition temperature. The term "transition temperature," refers to an approximate temperature at which a material undergoes a transition between two states. The transition temperature can refer to a single temperature or to a temperature range over which the transition occurs, such as in the case of paraffin wax. The selection of a phase change material can depend upon the transition temperature that is desired for a particular application that is going to include the phase change material. For example, a phase change material having a transition temperature near normal body temperature or around 37 degrees Celsius (° C.). The phase change material can have a transition temperature of −5 to 150° C., where such a temperature can be desirable for electronics applications to prevent user injury and protect components from overheating. In general, however, the phase change material can have a transition temperature of −100 to 150° C., or −5 to 150° C., or 0 to 90° C., or 30 to 70° C., or 35 to 50° C. The phase change material can have a transition temperature of 25 to 105° C., or 28 to 60° C., or 45 to 85° C., or 60 to 80° C., or 80 to 100° C. The phase change material can have a phase transition temperature of 5 to 70° C., 20 to 65° C., 25 to 60° C., or 30 to 50° C., or 35 to 45° C. For use in LED and electronic components, in particular, the phase change material incorporated into the phase change compositions can have a transition temperature of 0 to 115° C., 10 to 105° C., 20 to 100° C., or 30 to 95° C.

The transition temperature can be expanded or narrowed by modifying the purity of the phase change material, modifying the molecular structure, blending two or more phase change materials, or any combination thereof. For example, a phase change material comprising at least two or more different phase change materials can exhibit two or more different transition temperatures or a single modified transition temperature. Having multiple or broad transition temperatures can be advantageous as the amount of heat transfer as latent heat can be increased, thereby delaying the transfer of sensible heat. A phase change material with multiple or broad transition temperatures can therefore more efficiently help conduct heat away from a neighboring component by overlapping or staggering thermal absorptions. For instance, if a phase change composition contains a first phase change material (PCM1) that absorbs at 35 to 40° C. and a second phase change material (PCM2) that absorbs at 38 to 45° C., then, once the phase change composition reaches a temperature of 35° C. PCM1 can start absorbing heat as latent heat until its phase change is complete, during which time PCM2 will start absorbing heat as latent heat until its phase change is complete at a temperature of 45° C., increasing the temperature range over which heat is being absorbed as latent heat.

It is noted that the ability of the phase change material to absorb heat as latent heat during the phase change is transient and further heat transfer after the phase change results in an increase or decrease in the sensible heat, increasing or decreasing the temperature of the phase change material.

The selection of the phase change material can be based on its latent heat of fusion or the amount of energy absorbed or released as the phase change material undergoes its phase change per unit of material. The phase change material can have a latent heat of fusion that is at least 20 Joules per gram (J/g), or at least 40 J/g, or at least 50 J/g, or at least 70 J/g, or at least 80 J/g, or at least 90 J/g, or at least 100 J/g. The phase change material can have a latent heat of fusion of 50 to 400 J/g, or 60 to 400 J/g, or 80 to 400 J/g, or 100 to 400 J/g. The phase change material can have a latent heat of fusion of greater than or equal to 150 J/g, or greater than or equal to 180 J/g, or greater than or equal to 200 J/g. The heat of fusion of the phase change material can be determined by differential scanning calorimetry according to ASTM D3418-15.

Phase change materials that can be used include various organic and inorganic substances. The phase change material can comprise at least one of an organic compound (for example, a straight-chain alkane or a paraffinic hydrocarbon, a branched alkane, an unsaturated hydrocarbon (for example, an alkene or an alkyne), an alicyclic hydrocarbon, a halogenated hydrocarbon (for example, a 1-halide), or an aromatic compound or arene), a fatty acid (for example, caproic acid, caprylic acid, lauric acid, myristic acid, palmitic acid, stearic acid, arachidic acid, behenic acid, lignoceric acid, or cerotic acid), a dibasic acid, a fatty acid ester (for example, methyl caprylate, methyl caprate, methyl laurate, methyl myristate, methyl palmitate, methyl stearate, methyl arachidate, methyl behenate, or methyl lignocerate), a methyl ester, a dibasic ester, an alcohol (for example, a primary alcohol, a secondary alcohol, a tertiary alcohol, a polyhydric alcohol (for example, 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, or tris (hydroxymethyl)acetic acid), a fatty alcohol (for example, capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, or geddyl alcohol), a sugar alcohol (for example, erythritol, D-mannitol, galactitol, xylitol, or D-sorbitol)), a hydrated salt (for example, calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, or sodium acetate trihydrate), a polymer (for example, polyethylene, poly (ethylene glycol), polypropylene, poly(propylene glycol), poly(tetramethylene glycol), poly(propylene malonate), poly(neopentyl glycol sebacate), poly(pentane glutarate), poly(vinyl myristate), poly(vinyl stearate), poly(vinyl laurate), poly(hexadecyl methacrylate), poly(octadecyl methacrylate), a polyester produced by polycondensation of glycols (or their derivatives) with diacids (or their derivatives), a copolymer (for example, polyacrylate or poly(meth) acrylate with alkyl hydrocarbon side chain or with polyethylene glycol side chain, or a copolymer comprising at least one of polyethylene, poly(ethylene glycol), polypropylene, poly(propylene glycol), or poly(tetramethylene glycol)), an anhydride (for example, stearic anhydride), a silicone wax, a clathrate, a semi-clathrate, a gas clathrate, ethylene carbonate, an oil (for example, a vegetable oil (for example, soybean oil, palm oil, or castor oil)), water, or a metal. The phase change material can comprise an oil that can be purified or otherwise treated to render them suitable for use as phase change materials. The phase change material used in the phase change composition can be an organic substance.

The phase change material can comprise at least one of a paraffinic hydrocarbon, a fatty acid, or a fatty acid ester. The paraffinic hydrocarbon can have the formula $C_nH_{n+2}$, where n can be 10 to 44, or 10 to 36. The transition temperature and the heat of fusion of a homologous series of paraffin hydrocarbons, a homologous series of fatty acids, or a homologous series of fatty acid esters can be directly related to the number of carbon atoms. The phase change material can comprise at least one of a paraffinic hydrocarbon, a fatty acid, or a fatty acid ester having 15 to 40 carbon atoms, 18 to 35 carbon atoms, or 18 to 28 carbon atoms. The phase change material can be a single paraffinic hydrocarbon, fatty acid, or fatty acid ester, or a mixture of hydrocarbons, fatty acids, or fatty acid esters. The phase change material can comprise a vegetable oil.

The amount of the phase change material in the phase change layer can depend on the type of phase change material used, the desired transition temperature, the type of boron nitride used, and like considerations. The amount of the phase change material in the phase change layer can be 1 to 99 volume percent (vol %), or 50 to 99 vol %, or 80 to 95 vol % based on the total volume of the phase change layer. The amount of the phase change material in the phase change layer can be at least 65 vol %, at least 70 vol %, at least 75 vol %, at least 80 vol %, at least 85 vol %, at least 90 vol %, or at least 95 vol %, and no more than 99.9 vol %, no more than 98 vol %, no more than 97 vol %, or no more than 95 vol %, based on the total volume of the phase change layer. The first and second capping layers can each independently comprise 0 to 5 vol %, or 0 to 1 vol % of a phase change material based on the total volume of the phase change layer.

The phase change layer, the first capping layer, and the second capping layer can each independently comprise a binder. The phase change layer can comprise 0.5 to 15 vol %, or 1 to 6 vol % of the binder based on the total volume of the phase change layer. The first capping layer and the second capping layer can each independently comprise 10 to 100 vol %, or 30 to 70 vol %, or 30 to 50 vol % of the binder based on the total volume of the respective capping layer. The binder can comprise at least one of a thermoplastic polymer or a thermosetting polymer. The binder can comprise at least one of polystyrene, an epoxy, polybutadiene, or polyisoprene.

The thermoplastic polymer can comprise at least one of a polyolefin (for example, a cyclic olefin polymer), fluoropolymer, polyacetal, poly($C_{1-6}$ alkyl)acrylate, polyacrylamide, polyacrylonitrile, polyamide, polyamideimide, polyanhydride, polyarylene ether, polyarylene ether ketones, polyarylene ketone, polyarylene sulfide, polyarylene sulfone, polybenzothiazole, polybenzoxazole, polybenzimidazole, polycarbonate, polyester, polyetherimide, polyimide, poly($C_{1-6}$ alkyl)methacrylate, polymethacrylamide, polyoxadiazole, polyoxymethylene, polyphthalide, polysilazane, polysiloxane, polystyrene, polysulfide, polysulfonamide, polysulfonate, polythioester, polytriazine, polyurea, polyurethane, or a vinyl polymer.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl) methacrylate, acrylonitrile, vinyl acetate, allyl acetate, triallyl cyanurate, triallyl isocyanurate, or acrylamide. The weight average molecular weight of the prepolymers can be 400 to 10,000 Daltons based on polystyrene standards.

The phase change layer and optionally one or both of the first capping layer and the second capping layer comprise a plurality of boron nitride particles. The plurality of boron nitride particles can comprise one or both of single particles (primary particles) or agglomerates (secondary particles) containing a plurality of particles. The plurality of boron nitride particles (the primary particles or agglomerates of particles) can have an average particle size of 0.1 to 1,000 micrometers, or 5 to 500 micrometers, or 10 to 250 micrometers, or 25 to 150 micrometers, or 500 nanometers to 100 micrometers, or 3 to 40 micrometers. The plurality of boron nitride particles can comprise irregularly shaped hexagonal boron nitride platelets, having an average particle size of greater than or equal to 10 micrometers. "Particle size" as used herein refers to the mean diameter or equivalent diameter as best determined by standard laser particle measurement. The particle size can refer to the $D_{50}$ particle size that is known as the median diameter or the median value of the particle size distribution; it is the value of the particle diameter at 50% in the cumulative distribution by mass.

The plurality of boron nitride particles can be in the form of at least one of a powder (which includes flakes, platelets, and other shapes), fibers, rods, whiskers, sheets, nanosheets, agglomerates, or boron nitride nanotubes (BNNT), and can vary as to crystalline type, shape, and size, and including a distribution of the foregoing. The plurality of boron nitride particles can have an average aspect ratio (the ratio of width or diameter to length of a particle) of 1:2 to 1:100,000, or 1:5 to 1:1,000, or 1:10 to 1:300. Exemplary shapes of particles having particularly high aspect ratios include platelets, rod-like particles, fibers, whiskers, and the like. The plurality of boron nitride particles can comprise boron nitride platelets, for example, hexagonal boron nitride in the form of platelets. The exact shape of the platelets is not critical. In this regard, the boron nitride platelets can have irregular shapes. It is noted the term "platelets" as used herein is generally descriptive of any thin, flattened particles, inclusive of flakes. The platelets can have an average aspect ratio (the ratio of width to length of a particle) of 4:5 to 1:300, or 1:2 to 1:300, or 1:2 to 1:200, or 3:5 to 1:100, or 1:25 to 1:100.

Regarding crystalline type, the boron nitride particles can comprise at least one structure that is hexagonal, cubic, wurtzite, rhombohedral, or other synthetic structure. Among the various structures, boron nitride particles of hexagonal structure (hBN) can obtain superior thermal conductivity of, for example, 10 to 300 W/mK or more, and particles of cubic structure can obtain an extremely high thermal conductivity of 1,300 W/mK maximum. The thermal conductivity of the boron nitride particles can be determined in accordance with ASTM E1225-13. Hexagonal boron nitride has a layered structure, analogous to graphite, in which the layers are stacked in registration such that the hexagonal rings in layers coincide. The positions of N and B atoms alternate from layer to layer. The plurality of boron nitride particles can have a hexagonal structure with a crystallization index of at least 0.12, or 0.20 to 0.55, or 0.30 to 0.55. The hexagonal boron nitride particles can be obtained from a variety of commercial sources.

Boron nitride particles, crystalline or partially crystalline, can be made by processes known in the art. These include, for example, boron nitride powder produced from the pressing process disclosed in U.S. Pat. Nos. 5,898,009 and 6,048,511, the boron nitride agglomerated powder disclosed in U.S. Patent Publication No. 2005/0041373, and the highly delaminated boron nitride powder disclosed in U.S. Pat. No. 6,951,583. A variety of boron nitride powders are commercially available, for example, from Momentive under the trade name POLARTHERMA™ boron nitride.

The plurality of boron nitride particles can comprise a coating. The coating can comprise at least one of carbon, aluminum, silicon, germanium, copper, nickel, palladium, platinum, iridium, cobalt, iron, ruthenium, molybdenum, tungsten, tantalum, zirconium, or titanium, for example, in the form of at least one of a carbide, an oxide, a nitride, a sulfide, or a phosphide. The coating can comprise at least one of an inorganic carbide (such as aluminum carbide or titanium carbide), an inorganic oxide (such as aluminum oxide ($Al_2O_3$), magnesium oxide, silicon dioxide ($SiO_2$), titanium dioxide, yttria oxide, zirconium oxide, or zinc oxide), an inorganic nitride (such as aluminum nitride (AlN) or silicon nitride), an inorganic sulfide (such as gallium sulfide, molybdenum sulfide, or tungsten sulfide), an inorganic hydroxide (such as aluminum hydroxide ($Al_xO_yH_z$), zinc hydroxide ($Zn_xO_yH_z$), or silicon hydroxide ($Si_xO_yH_z$)), or an inorganic phosphide. The coating can comprise at least one of silicon dioxide or aluminum oxide. The coating can comprise one or more distinct coating layers that can optionally be alternating layers. The coating can be applied to the plurality of boron nitride particles via atomic layer deposition (ALD). ALD is a type of chemical vapor deposition, in which a thin film is deposited onto a substrate using gas phase chemical precursors, which react at the substrate surface.

The plurality of boron nitride particles can be surface treated with a coupling agent. Coupling agents promote the formation of or participate in covalent bonds that improve adhesion between the filler and the thermoset polymer matrix. Exemplary coupling agents include silanes, zirconates, titanates, and the like, such as vinyltrichlorosilane, vinyltrimethoxysilane, trivinylmethoxysilane, vinyltriethoxysilane, vinyltris(β-methoxyethoxy)silane, β-(3,4-epoxycyclohexyl)ethyltrimethoxysilane, N-phenyl-γ-aminopropyltrimethoxysilane, γ-glycidoxypropyltrimethoxysilane, N-β(aminoethyl)γ-aminopropyltrimethoxysilane, γ-glycidoxypropylmethyldiethoxysilane, N-β(aminoethyl)γ-aminopropyltriethoxysilane, γ-glycidoxypropyltriethoxysilane, N-β(aminoethyl)γ-aminopropylmethyldimethoxysilane, bis(trimethoxysilylethyl)benzene, γ-methacryloxypropylmethyldimethoxysilane, γ-methacryloxypropyltrimethoxysilane, γ-methacryloxypropylmethyldiethoxysilane, γ-methacryloxypropyltriethoxysilane, bis(triethoxysilyl)ethylene, triethoxysilyl-modified butadiene, styrylethyltrimethyloxysilane, γ-aminopropyltrimethoxysilane, γ-aminopropyltriethoxysilane, trimethoxyphenylsilane, perfluorooctyltriethoxysilane, or γ-mercaptopropyltrimethoxysilane.

The phase change layer can comprise 5 to 95 vol %, or 50 to 90 vol % of the plurality of boron nitride particles based on the total volume of the phase change layer. The first capping layer and the second capping layer can each independently comprise 0 to 90 vol %, or 10 to 80 vol %, or 30 to 70 vol %, or 50 to 70 vol % of a plurality of boron nitride particles based on a volume of the respective capping layer. At least one of the capping layers can comprise greater than 0 to 90 vol %, or 30 to 70 vol %, or 50 to 70 vol % of a plurality of boron nitride particles based on the total volume of the respective capping layer.

The boron nitride particles in the phase change layer can be aligned. For example, an average angle of the boron nitride particles can be 0 to 45°, or 10 to 35°, where the angle, θ, is measured along the perpendicular, see FIG. 1.

The phase change layer, the first capping layer, and the second capping layer can each independently comprise an additional filler other than the boron nitride, for example, to adjust the dielectric properties of the layered phase change composite. A low coefficient of expansion filler, such as glass beads, silica or ground micro-glass fibers, can be used. A thermally stable fiber, such as an aromatic polyamide, or a polyacrylonitrile can be used. Representative fillers include titanium dioxide (rutile and anatase), barium titanate, strontium titanate, fused amorphous silica, corundum, wollastonite, aramide fibers (e.g., KEVLAR™ from DuPont), fiberglass, $Ba_2Ti_9O_{20}$, quartz, aluminum nitride, silicon carbide, beryllia, alumina, magnesia, mica, talcs, nanoclays, aluminosilicates (natural and synthetic), or fumed silicon dioxide (e.g., CAB-O-SIL™, from Cabot Corporation), each of which can be used alone or in combination.

The additional filler can be in the form of solid, porous, or hollow particles. The particle size of the additional filler affects a number of important properties including coefficient of thermal expansion, modulus, elongation, and flame resistance. The additional filler can have an average particle size of 0.1 to 15 micrometers, or 0.2 to 10 micrometers. A combination of fillers having a bimodal, trimodal, or higher average particle size distribution can be used. The filler can be included in an amount of 0.1 to 80 vol %, or 1 to 65 vol %, or 5 to 50 vol % based on a total volume of the respective layer.

The phase change layer, the first capping layer, and the second capping layer can each independently comprise an additive such as at least one of a flame retardant, a cure initiator, a crosslinking agent, a viscosity modifier, a wetting agent, or an antioxidant. The particular choice of additives can depend on the polymer used, the particular application of the layered phase change composite, or the desired properties for that application, and can be selected so as to enhance or not substantially adversely affect the electrical properties when used in a circuit subassembly, such as thermal conductivity, dielectric constant, dissipation factor, dielectric loss, or other desired properties.

The flame retardant can be inorganic and can be present in the form of particles. The inorganic flame retardant can comprise a metal hydrate, having, for example, a volume average particle diameter of 1 to 500 nanometers (nm), or 1 to 200 nm, or 5 to 200 nm, or 10 to 200 nm; alternatively the volume average particle diameter can be 500 nm to 15 micrometer, or 1 to 5 micrometer. The metal hydrate can comprise a hydrate of a metal, for example, at least one of Mg, Ca, Al, Fe, Zn, Ba, Cu, or Ni. Hydrates of Mg, Al, or Ca can be used, for example, at least one of aluminum hydroxide, magnesium hydroxide, calcium hydroxide, iron hydroxide, zinc hydroxide, copper hydroxide, nickel hydroxide, or hydrates of calcium aluminate, gypsum dihydrate, zinc borate or barium metaborate. Composites of these hydrates can be used, for example, a hydrate containing Mg and at least one of Ca, Al, Fe, Zn, Ba, Cu, or Ni. A composite metal hydrate can have the formula $MgM_x(OH)_y$ wherein M is Ca, Al, Fe, Zn, Ba, Cu, or Ni, x is 0.1 to 10, and y is 2 to 32. The flame retardant particles can be coated or otherwise treated to improve dispersion or other properties.

Organic flame retardants can be used alternatively or in addition to the inorganic flame retardants. Examples of organic flame retardants include melamine cyanurate, fine particle size melamine polyphosphate, various other phosphorus-containing compounds such as aromatic phosphinates, diphosphinates, phosphonates, phosphates, polysilsesquioxanes, siloxanes, or halogenated compounds (such as hexachloroendomethylenetetrahydrophthalic acid (HET acid), tetrabromophthalic acid, or dibromoneopentyl glycol). Examples of brominated flame retardants include SAYTEX™ BT93W (ethylene bistetrabromophthalimide), SAYTEX™ 120 (tetradecabromodiphenoxy benzene), or SAYTEX™ 102 (decabromodiphenyl oxide), commercially available from Albermarle Corporation. The flame retardant can be used in combination with a synergist, for example, a halogenated flame retardant can be used in combination with a synergists such as antimony trioxide, and a phosphorus-containing flame retardant can be used in combination with a nitrogen-containing compound such as melamine.

The layered phase change composite can be formed by forming the first capping layer from a first composition; forming the phase change layer from a phase change composition, wherein the forming the phase change layer comprises vibrating the phase change composition on a 3-directional vibration stage; and forming the second capping layer from a second composition. Forming the first capping layer and the second capping layer can each independently comprise vibrating the respective composition on a 3-directional vibration stage. Forming the phase change layer can comprise heating the phase change composition to a temperature greater than or equal to the phase change temperature.

The phase change composition can be free of a solvent. For example, the phase change composition can comprise 0 to 0.5 wt %, or 0 wt % of a solvent based on a total weight of the phase change composition.

In an aspect, the layered phase change composite can comprise a phase change layer comprising a phase change material, a plurality of boron nitride particles, and a binder; and a first capping layer or both a first capping layer and a second capping layer located on opposing sides of the phase change layer. The phase change layer can comprise 1 to 99 vol %, of the phase change material, 5 to 95 vol % of the plurality of boron nitride particles, and 0.5 to 15 vol % of the binder, each based on the total volume of the phase change layer. The phase change material can have a transition temperature of −5 to 150° C. The phase change material can comprise at least one of a $C_{10-36}$ alkane, a $C_{10-35}$ fatty acid, a $C_{10-35}$ fatty acid ester, or a vegetable oil. The boron nitride particles can comprise a plurality of hexagonal boron nitride platelets. The binder can comprise at least one of polystyrene, epoxy, polybutadiene, or polyisoprene. A thickness of the phase change layer can be 0.05 to 10 mm, or 0.5 to 2 mm, or 0.5 to 1.5 mm, and each of the capping layers independently can have a layer thickness of 0.001 to 1 mm, or 0.01 to 0.5 mm. The first capping layer and the second capping layer can each independently comprise 10 to 100 vol % of a binder, for example, an epoxy, based on the total volume of the respective capping layer, and optionally a plurality of hexagonal boron nitride platelets.

The layered phase change composite can be formed by forming a first capping layer from a first composition comprising a polymer and optionally a plurality of boron nitride particles; casting a curable composition comprising a phase change material and a first plurality of boron nitride particles on the 3-directional vibration stage, vibrating the stage in three directions, and curing the curable composition hardener to form the phase change layer; and forming a second capping layer from a second composition comprising a second polymer and optionally a second plurality of boron nitride particles on the phase change layer.

The layered phase change composite can be formed by casting a first curable composition comprising a first solvent and optionally a plurality of boron nitride particles on a 3-directional vibration stage, evaporating the first solvent while vibrating the stage in three directions, and curing the first curable composition to form the first capping layer; casting a curable composition comprising a phase change material and a first plurality of boron nitride particles on the 3-directional vibration stage, vibrating the stage in three directions, and curing the curable composition to form the phase change layer; and casting a second curable composition comprising a second solvent and optionally a second plurality of boron nitride particles on a 3-directional vibration stage, evaporating the second solvent while vibrating the stage in three directions, and curing the second curable composition to form the second capping layer. The first curable composition can comprise a first epoxy and a first hardener. The second curable composition can comprise a second epoxy and a second hardener. The phase change composition can comprise a binder. It is noted that forming the first and the second capping layers can each independently be performed without vibrating, especially in the case where they are free of a plurality of boron nitride particles.

Each of the first curable composition and the second curable composition independently can comprise 3 to 50 wt % of the first solvent and the second solvent, respectively, based on a total weight of the respective compositions. The first solvent and the second solvent independently can comprise at least one of methanol, ethanol, isopropanol, butanol, xylene, toluene, methyl ethyl ketone, methyl isobutyl ketone, hexane, heptane, octane, nonane, cyclohexane, isophorone, or a terpene-based solvent. The first capping composition and the second composition can each independently comprise 3 to 50 wt % of a solvent, based on a total weight of the respective capping composition.

The layers of the composite can be formed in a layer-by-layer method, where the first capping layer is formed, the phase change layer is formed on the first capping layer, and the second capping layer is formed on the phase change layer. For example, the forming the phase change layer can comprise casting the curable composition onto the first capping layer and the forming the second capping layer can comprise casting the second curable composition onto the phase change layer. Conversely, the forming the layers of the composite can comprise forming a layered stack of the first capping layer, the phase change layer, and the second capping layer and then laminating the layered stack.

When vibrating is used, the vibrating can comprise vibrating the respective composition until a gel point is reached. The vibrating can comprise vibrating in a z-direction at a vibration frequency of 60 hertz (Hz), where the vibration can predominantly be in the z axis, with vibration noise in x- and y-directions.

The respective layers can be formed by spray coating, air atomized spraying, airless atomized spraying, electrostatic spraying, slot die coating, contact slot coating, curtain coating, knife coating, roller coating, kiss coating, transfer coating, brushing, screen-printing, padding, dip coating, saturating, printing, pressure or gravity feed nozzles/guns, hot melt applicators, molding, overmolding, injection molding, reaction injection molding, pultrusion, extrusion, plasma coating, or using a resin infusion process (for example, resin transfer molding (RTM), vacuum infusion process (VIP), or vacuum assisted RTM (VAR™)).

The first capping layer and the second capping layer can each independently be formed by casting onto a carrier, from which it is later released, or alternatively onto a conductive metal layer that can later be formed into a layer of a circuit structure.

After each layer is formed independently a solvent, if present, can be evaporated. After each layer is formed independently, the layer, where applicable, can be at least partially cured (B-staged), or the layer can be fully cured. Each layer independently can be initially partially cured and then fully cured in the layered stack to promote adhesion between the respective layers. Each layer independently can be heated, for example, at 20 to 200° C., or 30 to 150° C., or 40 to 100° C.

The layered phase change composite can optionally comprise one or more additional layers. For example, one or more additional phase change layers can be present, optionally with additional capping layers. The composition can comprise an adhesive layer, for example, located between the phase change layer and a capping layer. Conversely, the phase change layer can be in direct physical contact with one or both of the first capping layer and the second capping layer.

The layered phase change composite can provide improved thermal stability to the device, resulting in the ability to avoid degradation of performance and lifetime of the electronic devices. The combination of boron nitride particles and the phase change material can be advantageous for use as thermal management materials, especially in electronics, where the presence of the phase change material can allow for a combination of high latent heat capacity and energy absorption and the presence of the boron nitride can increase in the transfer rate of heat into and out of the phase change layer, which can lead to improved heat management, lower heat buildup, fewer problems, and faster processor speeds.

An article can comprise the layered phase change composite. The layered phase change composite can be used in a variety of applications, including electronic devices, LED devices, or batteries. The layered phase change composite can be used in a wide variety of electronic devices and any other devices that generate heat to the detriment of the performance of the processors and other operating circuits (memory, video chips, or telecom chips). Examples of such electronic devices include cell phones, personal digital assistants (PDAs), smart-phones, tablets, laptop computers, hand-held scanners, or other generally portable devices. The layered phase change composite can be incorporated into virtually any electronic device that requires cooling during operation, for example, electronics used in consumer products, medical devices, automotive components, aircraft components, radar systems, guidance systems, or global positioning systems. The layered phase change composite can be used in a battery, an engine control unit (ECU), an airbag module, a body temperature controller, a door module, a cruise control module, an instrument panel, a climate control module, an anti-lock braking module (ABS), a transmission controller, or a power distribution module. The layered phase change composite and articles thereof can also be incorporated into the casings of electronics or other structural components. In general, any device that relies on the performance characteristics of an electronic processor or other electronic circuit can benefit from the increased or more stable performance characteristics resulting from utilizing aspects of the layered phase change composites. In certain embodiments, the article is a thermal management material, a thermal pad, an electrode for energy storage, a supercapacitor, a fuel cell, a battery, a capacitive desalination device, an acoustic insulator, a thermal insulation composite, a chemical sensor, a mechanical sensor, a biomedical device, an actuator, an adsorbent, a catalyst support, a field emission device, a mechanical dampening device, a filter, a three-dimensional flexible electronic component, a circuit material, an integrated circuit package, a printed circuit board, an electronic device, a cosmetic product, a wearable electronic, a high efficiency flexible electronic device, a power electronics device, a high frequency device, or an energy storage device.

The layered phase change composites can be incorporated into virtually any electronic device that requires cooling during operation. For example, electronics used in automotive components, aircraft components, radar systems, guidance systems, and GPS devices incorporated into civilian and military equipment and other vehicles can benefit from the layered phase change composite such as engine control units (ECU), airbag modules, body controllers, door modules, cruise control modules, instrument panels, climate control modules, anti-lock braking modules (ABS), transmission controllers, or power distribution modules. The layered phase change composites and articles including the composites can also be incorporated into the casings of electronics or other structural components. In general, any device that relies on the performance characteristics of an electronic processor or other electronic circuit can benefit from the increased or more stable performance characteristics resulting from utilizing aspects of the composites disclosed herein.

The following examples are provided to illustrate the present disclosure. The examples are merely illustrative and are not intended to limit devices made in accordance with the disclosure to the materials, conditions, or process parameters set forth therein.

EXAMPLES

Example 1

A first capping layer was prepared by casting a composition comprising 20 wt % of isopropanol, 48 wt % of boron nitride particles, and 32 wt % a curable epoxy in a dish having a diameter of 3.3 centimeters. The dish was then vibrated in the x-, y-, and z-directions while the solvent was evaporated. After the solvent was evaporated, the epoxy was cured to form the first capping layer. The vibration was stopped once the composition reached the point of gelation.

Figure 2:
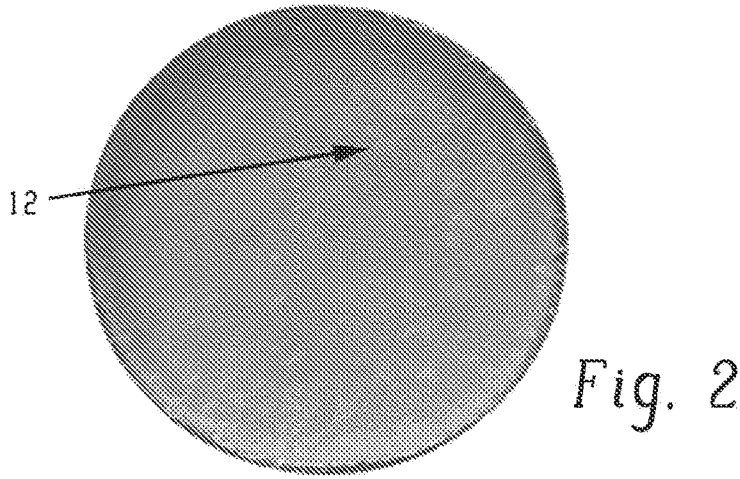
FIG. 2 is microscope image of a top down view of the phase change layer of Example 1 after curing.

A phase change composition was then cast onto the first capping layer. The phase change composition comprised 90 wt % of paraffin and 10 wt % of a mixture of boron nitride and an epoxy. The phase change composition was vibrated in the x-, y-, and z-directions and the epoxy was cured to form the phase change layer. FIG. 2 is microscope image of a top down view of a phase change layer after curing. FIG. 2 shows that domains 12 of the boron nitride particles formed in the phase change layer.

A second composition was then cast onto the phase change layer. The second composition comprised 20 wt % of isopropanol, 48 wt % of boron nitride particles, and 32 wt % a curable epoxy. The dish was then vibrated in the x-, y-, and z-directions while the solvent was evaporated. After the solvent was evaporated, the epoxy was cured to form the second capping layer. The vibration was stopped once the composition reached the point of gelation. The layered phase change composite was then dried for 2 hours at room temperature (approximately 20 to 25° C.).

Figure 3:
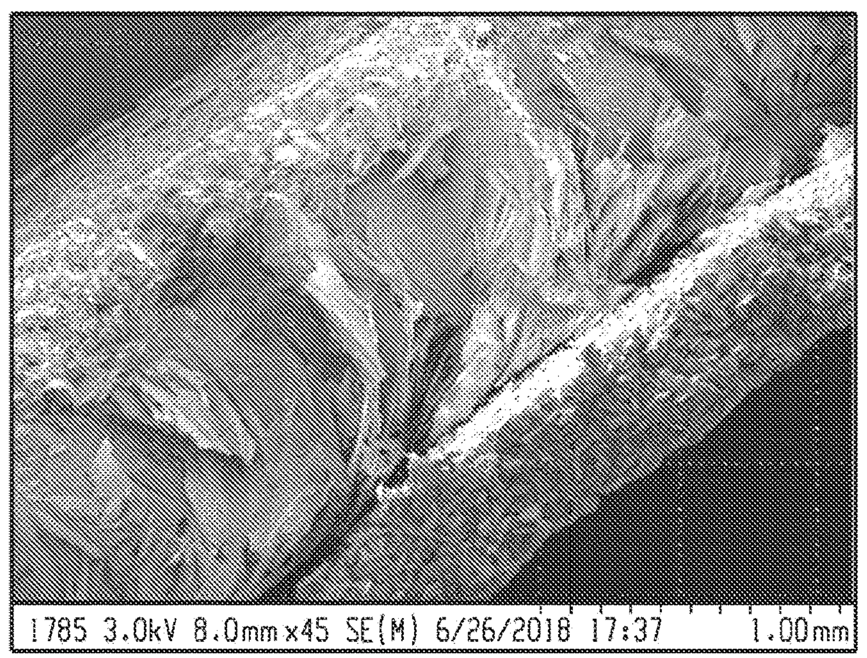
FIG. 3 is a scanning electron microscopy image of a cross-section of a layered phase change composite of Example 1.

FIG. 3 is a scanning electron microscopy image of a cross-section of the layered phase change composite. FIG. 3 illustrates excellent alignment of the boron nitride particles in the phase change layer in the direction perpendicular to the broad surfaces of the composite.

Set forth below are non-limiting aspects of the present disclosure.

Aspect 1: A layered phase change composite comprising: a phase change layer comprising a phase change material, a plurality of boron nitride particles, and a binder; and a first capping layer and a second capping layer located on opposing sides of the phase change layer.

Aspect 2: The composite of Aspect 1, wherein the phase change material comprises at least one of a $C_{10-36}$ alkane, a $C_{10-35}$ fatty acid, a $C_{10-35}$ fatty acid ester, or a vegetable oil.

Aspect 3: The composite of any one or more of the preceding aspects, wherein phase change layer comprises 1 to 99 vol %, or 50 to 99 vol %, or 80 to 95 vol % of the phase change material based on the total volume of the phase change layer.

Aspect 4: The composite of any one or more of the preceding aspects, wherein phase change material has a transition temperature in the range of −5 to 150° C.

Aspect 5: The composite of any one or more of the preceding aspects, wherein the plurality of boron nitride particles comprises a plurality of hexagonal boron nitride platelets.

Aspect 6: The layered phase change composite of any one or more of the preceding aspects, wherein phase change layer comprises 5 to 95 vol %, or 50 to 90 vol % of the plurality of boron nitride particles based on the total volume of the phase change layer.

Aspect 7: The layered phase change composite of any one or more of the preceding aspects, wherein the binder comprises at least one of polystyrene, epoxy, polybutadiene, or polyisoprene.

Aspect 8: The layered phase change composite of any one or more of the preceding aspects, wherein phase change layer comprises 0.5 to 15 vol %, or 1 to 6 vol % of the binder based on the total volume of the phase change layer.

Aspect 9: The layered phase change composite of any one or more of the preceding aspects, wherein a thickness of the phase change layer is 0.05 to 10, or 0.5 to 2, or 0.5 to 1.5 mm.

Aspect 10: The layered phase change composite of any one or more of the preceding aspects, wherein the first capping layer and the second capping layer comprise an epoxy.

Aspect 11: The layered phase change composite of any one or more of the preceding aspects, wherein the first capping layer and the second capping layer each independently comprise 10 to 100 vol %, or 30 to 70 vol %, or 30 to 50 vol % of a binder based on the total volume of the respective capping layer.

Aspect 12: The layered phase change composite of any one or more of the preceding aspects, wherein at least one of the first capping layer and the second capping layer comprises a plurality of boron nitride particles.

Aspect 13: The layered phase change composite of any one or more of the preceding aspects, wherein at least one of the capping layers comprises 0 to 90 vol %, or 30 to 70 vol %, or 50 to 70 vol % of a plurality of boron nitride particles based on a total volume of the respective capping layer.

Aspect 14: The layered phase change composite of any one or more of the preceding aspects, wherein each of the capping layers independently has a layer thickness of 0.001 to 1 mm, or 0.01 to 0.5 mm.

Aspect 15: The layered phase change composite of any one or more of the preceding aspects, wherein the layered phase change composite has a heat of fusion of at least 50 J/g, or at least 75 J/g, or at least 100 J/g, or at least 50 to 150 J/g measured using thermal gravitational analysis.

Aspect 16: The layered phase change composite of any one or more of the preceding aspects, wherein the composite has a thermal conductivity of greater than 0.5 W/mK, or 0.5 to 1 W/mK measured in accordance with ASTM $D_{5470}$-17.

Aspect 17: The layered phase change composite of any one or more of the preceding aspects, further comprising a flame retardant.

Aspect 18: An article comprising the layered phase change composite of any one or more of the preceding aspects.

Aspect 19: The article of Aspect 18, wherein the article is a thermal management material, a thermal pad, an electrode for energy storage, a supercapacitor, a fuel cell, a battery, a capacitive desalination device, an acoustic insulator, a thermal insulation composite, a chemical sensor, a mechanical sensor, a biomedical device, an actuator, an adsorbent, a catalyst support, a field emission device, a mechanical dampening device, a filter, a three-dimensional flexible electronic component, a circuit material, an integrated circuit package, a printed circuit board, an electronic device, a cosmetic product, a wearable electronic, a high efficiency flexible electronic device, a power electronics device, a high frequency device, or an energy storage device.

Aspect 20: A method of making the layered phase change composite of any one or more of Aspects 1 to 17, comprising: forming the first capping layer from a first composition, wherein the forming the first capping layer optionally comprises vibrating the first composition on a 3-directional vibration stage; forming the phase change layer from a phase change composition, wherein the forming the phase change layer comprises vibrating the phase change composition on a 3-directional vibration stage; and forming the second capping layer from a second composition, wherein the forming the second capping layer optionally comprises vibrating the second composition on a 3-directional vibration stage; wherein the respective layers are each formed independently and then stacked on each other to form the composite and/or wherein at least one of the respectively layers is formed directly on one of the other layers.

Aspect 21: The method of Aspect 20, wherein the phase change composition is free of a solvent.

Aspect 22: The method of Aspect 20, wherein the forming the first capping layer comprises casting a first composition comprising a first curable composition (for example comprising a first epoxy, a first hardener), a first solvent, and a first plurality of boron nitride particles on a 3-directional vibration stage, evaporating the first solvent while vibrating the stage in three directions, and curing the first curable composition to form the first capping layer; wherein the forming the phase change layer comprises casting a phase change composition comprising the phase change material, a curable composition (for example, comprising an epoxy and a hardener), and the plurality of boron nitride particles on the 3-directional vibration stage, vibrating the stage in three directions, and curing the curable composition to form the phase change layer; wherein the forming the second capping layer comprises casting a second composition comprising a second curable composition (for example comprising (a second epoxy and a second hardener), a second solvent, and a second plurality of boron nitride particles on a 3-directional vibration stage, evaporating the second solvent while vibrating the stage in three directions, and curing the second curable composition to form the second capping layer.

Aspect 23: The method of Aspect 22, wherein the casting the phase change composition comprises casting the phase change composition onto the first capping layer.

Aspect 24: The method of any one or more of Aspects 22 to 23, wherein the casting the second composition comprises casting the second composition onto the phase change layer.

Aspect 25: The method of any one or more of Aspects 22 to 24, wherein each of the casting steps independently comprise vibrating the respective composition until a gel point in reached.

Aspect 26: The method of any one or more of Aspects 20 to 21, further comprising stacking the first capping layer, the phase change layer, and the second capping layer to form a layered stack and laminating the layered stack.

Aspect 27: The method of any one or more of Aspects 20 to 26, wherein each of the first composition and the second composition independently comprise 3 to 50 wt % of the first solvent and the second solvent, respectively, based on a total weight of the respective compositions.

Aspect 28: The layered phase change composite of any one or more of the preceding aspects, comprising: 1 to 99 vol % of the phase change layer comprising a phase change material comprising at least one of a $C_{10-36}$ alkane, a $C_{10-35}$ fatty acid, a $C_{10-35}$ fatty acid ester, or a vegetable oil; 5 to 95 vol % of the plurality of boron nitride particles comprising a plurality of hexagonal boron nitride platelets; and 0.5 to 15 vol % of the binder comprising at least one of polystyrene, epoxy, polybutadiene, or polyisoprene; and a first capping layer and a second capping layer located on opposing sides of the phase change layer. A thickness of the phase change layer can be 0.05 to 10 mm, or 0.5 to 2 mm, or 0.5 to 1.5 mm and each of the capping layers independently can have a layer thickness of 0.001 to 1 mm, or 0.01 to 0.5 mm. The first capping layer and the second capping layer can each independently comprise 10 to 100 vol % of a binder based on the total volume of the respective capping layer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears. The endpoints of all ranges directed to the same component or property are inclusive of the endpoints, are independently combinable, and include all intermediate points and ranges. For example, ranges of "up to 25 volume percent, or 5 to 20 volume percent" is inclusive of the endpoints and all intermediate values of the ranges of "5 to 25 volume percent," such as 10 to 23 volume percent, etc. The terms "first," "second," and the like, as used herein do not denote any order, quantity, or importance, but rather are used to distinguish one element from another. When an element such as a layer, film, region, or substrate is referred to as being "on" another element, it can be directly on the other element or intervening elements may also be present. In contrast, when an element is referred to as being "directly on" or "in direct physical contact with" another element, there are no intervening elements present.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A layered phase change composite comprising:

a phase change layer comprising at least 65 volume percent of a phase change material, 5 to 34.5 volume percent of a plurality of boron nitride particles, and 0.5 to 15 volume percent a binder, based on a total volume of the phase change layer; and a first capping layer and a second capping layer located on opposing sides of the phase change layer, wherein boron nitride particles in the phase change layer are aligned.

2. The layered phase change composite of claim 1, wherein the phase change material comprises at least one of a $C_{10-36}$ alkane, a $C_{10-35}$ fatty acid, a $C_{10-35}$ fatty acid ester, or a vegetable oil.

3. The layered phase change composite of claim 1, wherein phase change material has a transition temperature of −5 to 150 degrees Celsius.

4. The layered phase change composite of claim 1, wherein at least one of the plurality of boron nitride particles comprises a plurality of hexagonal boron nitride platelets; or the binder comprises at least one of polystyrene, epoxy, polybutadiene, or polyisoprene.

5. The layered phase change composite of claim 1, wherein phase change layer comprises 0.5 to 15 volume percent of the binder based on the total volume of the phase change layer; and wherein the binder comprises an epoxy.

6. The layered phase change composite of claim 1, wherein a thickness of the phase change layer is 0.05 to 10 mm; and wherein each of the capping layers independently has a layer thickness of 0.001 to 1 mm.

7. The layered phase change composite of claim 1, wherein the first capping layer and the second capping layer comprise an epoxy.

8. The layered phase change composite of claim 1, wherein the first capping layer and the second capping layer each independently comprise 10 to 100 volume percent of a binder based on the total volume of the respective capping layer; and 0 to 90 volume percent of a plurality of boron nitride particles based on the total volume of the respective capping layer.

9. The layered phase change composite of claim 1, wherein the layered phase change composite has at least one of a heat of fusion of at least 50 J/g measured using thermal gravitational analysis; or wherein the layered phase change composite has a thermal conductivity of greater than 0.5 Watts per meter Kelvin measured in accordance with ASTM D5470-17.

10. An article comprising the layered phase change composite of claim 1.

11. The article of claim 10, wherein the article is a thermal management material, a thermal pad, an electrode for energy storage, a supercapacitor, a fuel cell, a battery, a capacitive desalination device, an acoustic insulator, a thermal insulation composite, a chemical sensor, a mechanical sensor, a biomedical device, an actuator, an adsorbent, a catalyst support, a field emission device, a mechanical dampening device, a filter, a three-dimensional flexible electronic component, a circuit material, an integrated circuit package, a printed circuit board, an electronic device, a cosmetic product, a wearable electronic, a high efficiency flexible electronic device, a power electronics device, a high frequency device, or an energy storage device.

12. The layered phase change composite of claim 1, wherein boron nitride particles in the phase change layer are aligned at an average angle of 0 to 45°, measured relative to a direction perpendicular to a broad surface of the phase change layer.

13. A method of making the layered phase change composite of claim 1, comprising:

forming the first capping layer from a first composition, wherein the forming the first capping layer optionally comprises vibrating the first composition on a 3-directional vibration stage;

forming the phase change layer from a phase change composition, wherein the forming the phase change layer comprises vibrating the phase change composition on a 3-directional vibration stage; and forming the second capping layer from a second composition, wherein the forming the second capping layer optionally comprises vibrating the second composition on a 3-directional vibration stage; and wherein the respective layers are each formed independently and then stacked on each other to form the composite and/or wherein at least one of the respective layers is formed directly on one of the other layers.

14. The method of claim 13, wherein the phase change composition is free of a solvent.

15. The method of claim 13, wherein the forming the first capping layer comprises casting a first composition comprising a first curable composition, a first solvent, and a first plurality of boron nitride particles on a 3-directional vibration stage, evaporating the first solvent while vibrating the stage in three directions, and curing the first curable composition to form the first capping layer;

wherein the forming the phase change layer comprises casting a phase change composition comprising the phase change material, a curable composition, and the plurality of boron nitride particles on the 3-directional vibration stage, vibrating the stage in three directions, and curing the curable composition to form the phase change layer;

wherein the forming the second capping layer comprises casting a second composition comprising a second curable composition, a second solvent, and a second plurality of boron nitride particles on a 3-directional vibration stage, evaporating the second solvent while vibrating the stage in three directions, and curing the second curable composition to form the second capping layer.

16. The method of claim 15, wherein the casting the phase change composition comprises casting the phase change composition onto the first capping layer.

17. The method of claim 15, wherein the casting the second composition comprises casting the second composition onto the phase change layer.

18. The method of claim 15, wherein each of the casting steps independently comprise vibrating the respective composition until a gel point in reached.

* * * * *